Figure 1:
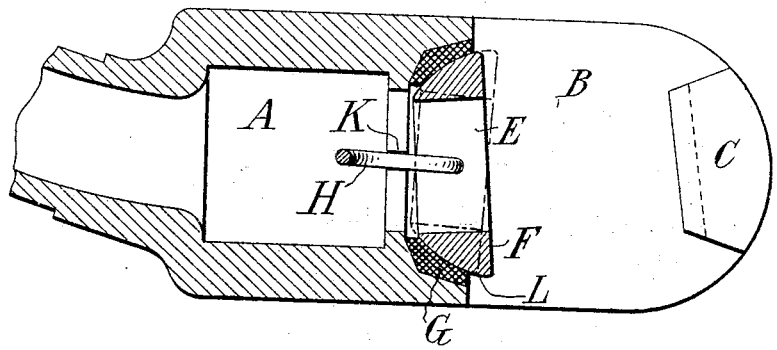

No. 804,005. PATENTED NOV. 7, 1905.
E. E. GOLD.
TRAIN PIPE COUPLING.
APPLICATION FILED NOV. 6, 1903.

WITNESSES:
Fred White
René Bruine

INVENTOR:
Edward E. Gold,
By Attorneys,

UNITED STATES PATENT OFFICE.

EDWARD E. GOLD, OF NEW YORK, N. Y.

TRAIN-PIPE COUPLING.

No. 804,005.          Specification of Letters Patent.          Patented Nov. 7, 1905.

Application filed November 6, 1903. Serial No. 180,131.

*To all whom it may concern:*

Be it known that I, EDWARD E. GOLD, a citizen of the United States, residing in the borough of Manhattan, city, county, and State of New York, have invented certain new and useful Improvements in Train-Pipe Couplings, of which the following is a specification.

This invention relates to couplings for hose or flexible pipes used principally for the steam-heating pipes of railway-cars. The invention provides particularly an improvement upon the coupling of this type which is largely in use for coupling the steam-heating pipes of railway-cars and known as the "Gold" coupler, the same being set forth in Patents No. 475,738, of May 24, 1892, and No. 550,267, of November 26, 1895. This coupler is characterized by a rocking or compensating seat or gasket formed as a segment of a sphere and entering a correspondingly-formed recess or socket in the coupling-head. To form a tight joint between the rocking seat or gasket and the coupling-head, the annular seat or gasket has heretofore been formed as a metal shell ground to a flat face on its front side and with a yielding composition on its rear or spherical side, where it fits within the spherical recess. My present invention provides an improved construction applicable to such couplings.

According to this invention the annular seat or gasket is formed of hard metal or incompressible material, and a tight joint is obtained by interposing between the gasket and the coupling-head a packing-ring of yielding material. The contact-faces of the ring and gasket with each other are annular and substantially circular in axial section, so as to permit a rocking movement of the gasket to enable the latter to make a true and tight fit against the reciprocal gasket of the complementary coupling-head, although the axes of the two coupling-heads may be at a slight angle with each other. The packing-ring is seated immovably in the coupling-head, preferably fitting a socket therein, the contact-faces of the two being non-circular in axial section. The non-circular character of the reciprocal contact-faces between the coupling-head and the packing-ring, in connection with a spring which is preferably used for holding the gasket and also the packing-ring in place, makes the packing-ring immovable, while permitting the necessary rocking movement of the gasket. The metal gasket extends beyond the packing-ring, so that in its inclined as well as in its central position it bears against substantially the entire spherical face of the packing-ring, and thus avoids the deformation which occurs with gaskets of comparatively soft material only a portion of the spherical face of which bears against a socket of metal.

The accompanying drawings illustrate coupling-heads embodying the invention.

Figure 2:
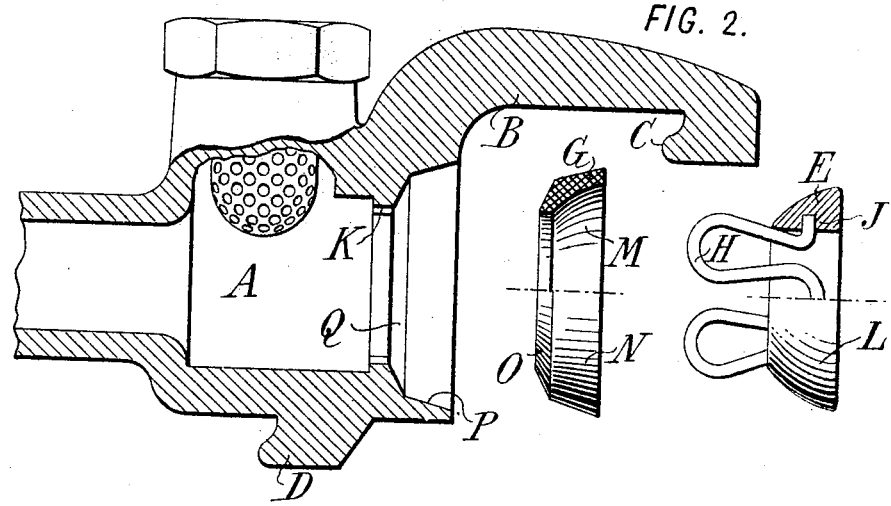
Figure 3:
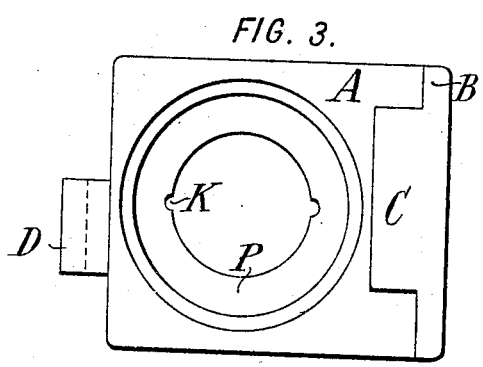
Figure 4:
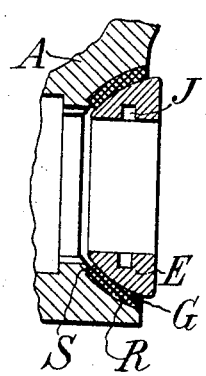
Figure 5:
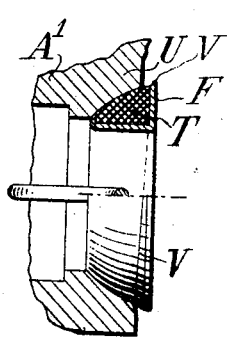

Figure 1 is a vertical mid-section of such a head. Fig. 2 is substantially a horizontal section of the same with the parts separated. Fig. 3 is an end view of the coupling-head of Figs. 1 and 2 with the gasket and packing-ring removed. Fig. 4 is a section similar to Fig. 2, showing another style of packing-ring and showing the parts in place. Fig. 5 is a section similar to Fig. 4, showing the effects of long use on the old style of coupling-head.

Referring to the embodiments illustrated, A is a coupling-head having the usual arm B with the undercut lug C at one side and having the boss or stud D on the other side. The gasket E is of the shape commonly used in the Gold coupler, but differs therefrom in being made of solid metal instead of a metallic shell packed with a yielding composition which is exposed on its rear face. (See Fig. 5.) The gasket E has a plane contact-face F to make a tight fit with the gasket of the complementary coupling-head and is backed by a packing-ring G, of any known or suitable packing material which is adapted to withstand heat and pressure. Vulcabeston is preferred, although various other materials or compositions may be used, such as asbestos packing or a soft metal or alloy. The gasket and packing-ring are held in the coupling-head by means of a spring H. The ends of the spring enter diametrically opposite recesses J in the gasket, and its expanding sides enter notches K in the head and by expanding against these notches hold the gasket and packing-ring in place and also hold the spring in its desired horizontal position to permit a slight vertical rocking, as indicated in Fig. 1. The rear or outer face L of the gasket is convex and substantially spherical and bears against a concave spherical face M of the packing-ring. As indicated by the sectional portions of the gasket and packing-ring in Figs. 1 and 2, the axial section of the annular contact-faces L and M is substantially circular, so that the gasket is free to rock within the ring.

The ring itself, however, should be immovable, and to this end its rear or outer face is an annulus whose axial section is non-circular. For example, as shown in Figs. 1 and 2, the contact-surface of the packing-ring with the coupling-head is composed of two conical surfaces N and O, the axial section of which is a broken line composed of two straight portions. The coupling-head is provided with corresponding surfaces P and Q, preferably forming a socket within the head and fitting the faces N O of the packing-ring. Thus there can be no rocking of the packing-ring in the coupling-head. At the same time the construction described provides a packing of approximately uniform thickness throughout, so as to equalize the pressure which is exerted upon the locking or wedging of the heads together and to resist the steam-pressure.

The particular style of spring shown embraces at once the gasket, packing-ring, and head, acting in conjunction with the non-circular contact-faces between the packing-ring and coupling-head socket to hold the ring immovable, and acting at the same time in conjunction with the spherical contact-faces of the gasket and the packing-ring and with the diametrically opposite sockets J and notches K to hold the gasket against the packing-ring with freedom to rock easily in one direction.

Fig. 5 shows one of the many possible variations of the shape of the contact-face between the packing-ring and the coupling-head. Said contact-face needs only to be non-circular to obtain the fixity desired. In this case the contact-face in axial section is composed of the union of a circular portion R and a straight portion S, which provides a packing-ring G of substantially uniform thickness throughout. The gasket and holding-spring may be identical with those shown in Fig. 2.

In the type of couplings previously in use, Fig. 5, in which the rear face of the gasket has been made of packing material T in order to secure a tight joint between it and the metal socket U ordinarily formed directly in the head, it is found that the wear and compression in use deform the gasket so that the portion within the socket U becomes reduced to a smaller size than the exterior or projecting portion and is pressed back in the socket. Even the metal, ordinarily brass, forming the seating-face F of the gasket is worn away by the harder metal, ordinarily cast-iron, of the coupling-head where the two come into engagement. Consequently there is formed a shoulder V, caused by a slight bulging out of the soft material beyond the face of the coupling-head A' and by a reduction of the size of the material within the socket. The shoulder V, however slight, interferes with the normal rocking action of the seat, and therefore prevents a perfect fit between the two seating-faces F of the complementary coupling-heads. In the present invention the gasket E has its circular seating-face wider than that of the packing-ring, so that it extends beyond the ring, and in normal rocking no portion of the ring is left projecting beyond the gasket, so as to be deformed and constitute a shoulder. The packing-ring therefore cannot, even if it may be worn, take a shouldered shape such as to interfere with the freedom of movement of the gasket, because it must be worn or compressed over its entire spherical face, and the gasket being harder than the packing-ring cannot be worn or deformed by pressing or rubbing against the softer packing-ring. The only result of use, therefore, is to cause the seat to recede or enter back deeper into the head by the slight amount permitted by the compressibility of the packing-ring. Such a recession of the gasket is allowable within certain limits without interfering with the normal locking together of the coupling-heads or the tightness of the fit between the two gaskets. The gasket protrudes somewhat, as shown in Figs. 1 and 4, to allow both for the rocking motion of the seat and for a certain amount of compression or wearing away of the packing-ring. When the packing-ring becomes worn or compressed so that the seat does not protrude sufficiently, it is easily removed by pulling out the seat E in the well-known manner, (by inserting a hook in the middle bend of the spring H,) whereupon the packing-ring G may be easily pulled out of its socket. The packing-ring after long use as well as in the beginning makes a close steam-tight fit with the gasket and with the socket in the coupling-head, so that no leakage can occur between it and the head or between it and the gasket.

The shape and proportions of the parts may be modified to a considerable extent without departing from the essential features of my invention. It is not strictly essential to my invention that the seat be spherically formed so as to be capable of universal motion, it being sufficient in a coupler of the type shown that it be capable of rocking in one direction—that is, around a horizontal axis parallel with the plane of the meeting faces. It is preferable, however, that the seat may be spherical, so as to have a universal compensating effect. In couplers of other types the seat and packing-ring may be correspondingly modified to adapt them to the structure of the coupling.

The seat or gasket E may be of hard metal or any hard incompressible material or may have a hard incompressible outer or meeting face, which should be ground or otherwise formed in a true plane to make a tight fit with the opposite seat. My invention enables the hardest materials to be used for the seat—such, for example, as case-hardened iron, or steel tempered to great hardness, or nickel-steel or nickel-copper steel—whereby the seating-face may be made so hard as to be free from injury by grit or other hard substances getting between the seating-faces of the respective coupling-heads.

Though I have described with great particularity of detail certain embodiments of the invention, yet it is to be understood that the invention is not limited to the specific embodiments disclosed. Various modifications thereof may be made by those skilled in the art without departure from the invention.

What I claim is—

A train-pipe coupler comprising a coupling-head, a compressible packing-ring and an incompressible gasket, said ring and gasket having annular contact-faces an axial section of which is substantially circular to permit a rocking movement of the gasket, the contact-face of the gasket being extended beyond that of the packing-ring to avoid deforming the face of the latter, and said head and packing-ring having annular contact-faces an axial section of which is a non-circular line so as to prevent movement of the packing-ring relatively to the head.

In witness whereof I have hereunto signed my name in the presence of two subscribing witnesses.

EDWARD E. GOLD.

Witnesses:
Thomas F. Wallace,
Fred White.